Oct. 17, 1944.    T. A. PETERMAN    2,360,619
RESILIENT WHEEL MOUNTING
Filed March 20, 1943    4 Sheets-Sheet 1

INVENTOR
THEODORE A. PETERMAN
BY Taylor and Larrayne
ATTORNEYS.

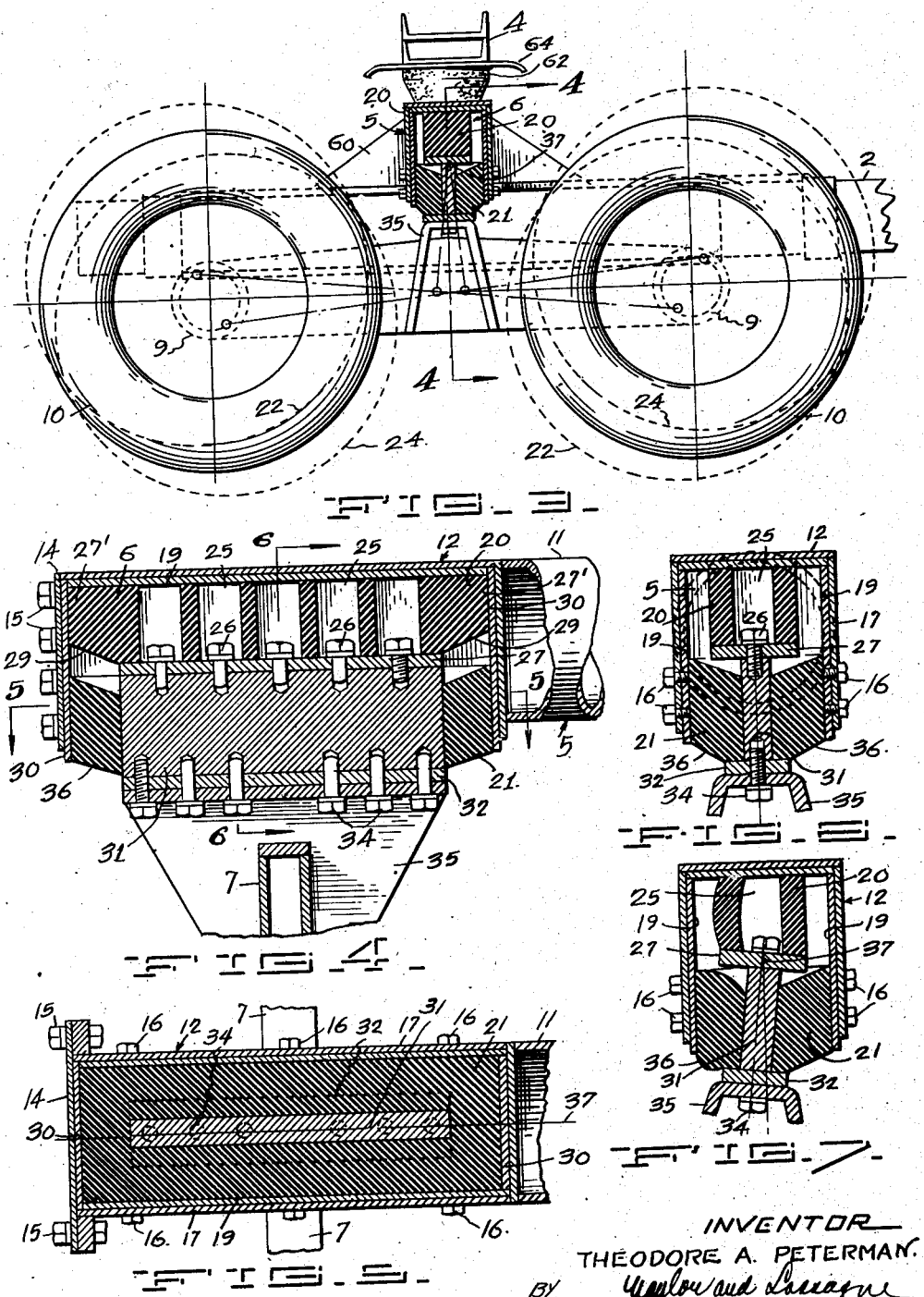

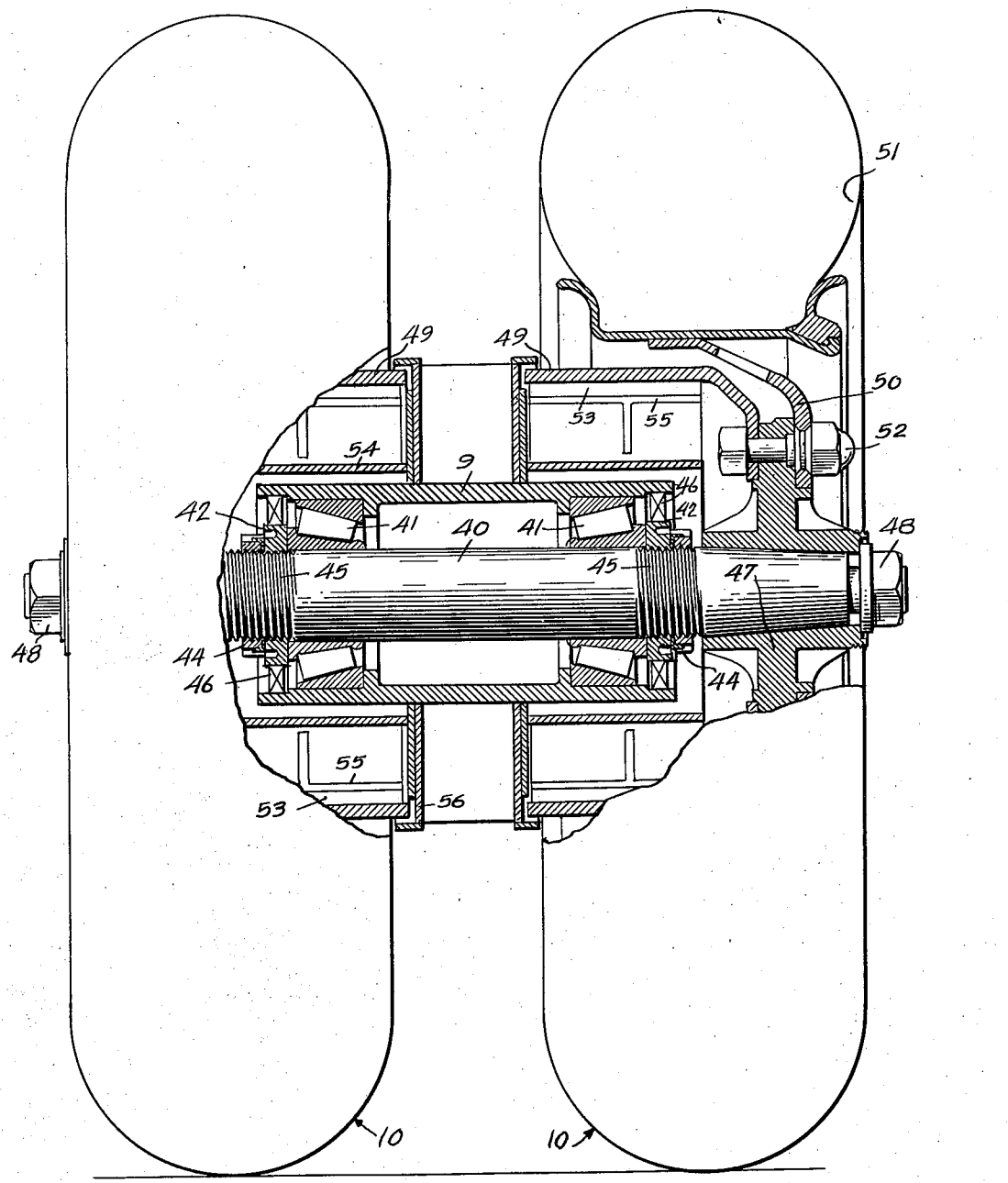

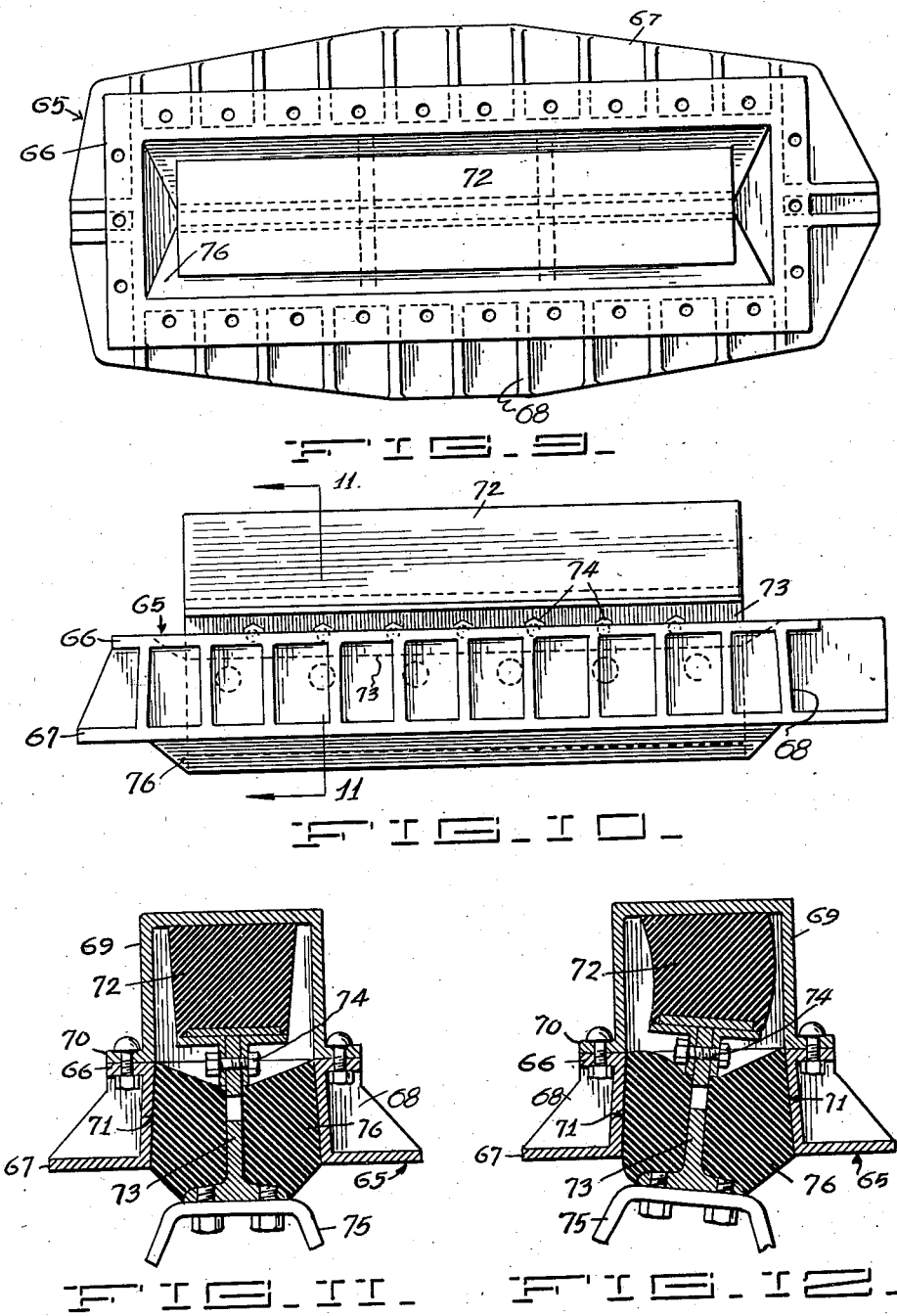

Patented Oct. 17, 1944

2,360,619

UNITED STATES PATENT OFFICE 2,360,619

RESILIENT WHEEL MOUNTING

Theodore A. Peterman, Tacoma, Wash.

Application March 20, 1943, Serial No. 479,872

10 Claims. (Cl. 280—124)

My invention relates to suspension systems, and particularly to resilient mountings for multiple-wheel truck and trailer units. The present application is a continuation in part of my copending application Serial Number 391,668, filed May 3, 1941, patented May 4, 1943, No. 2,318,257.

The transportation of heavy loads over rough terrains presents problems not encountered to a similar degree in hauling on smooth highways. An example of such service is found in the logging industry, where huge logs must be carried out of the forests over trails and unimproved roads to the saw mills. The dictates of economy require that such loads must be carried at substantial velocities, and the suspension systems used must be suitable for high speed hauling on paved roads wherever they are available.

The latter requirement practically eliminates track-laying vehicles from consideration, and makes it desirable to use a plurality of wheels to distribute the weight of the load over a larger area of the road surface. Each wheel unit must be resiliently connected to the load carrying frame independently of the other wheel units for smooth hauling. Such independent suspensions utilizing conventional steel springs and multiple bearings have been unsatisfactory in service. The springs required are cumbersome, making the unsprung weight ratio unfavorable. Lubrication and maintenance of bearings have been expensive and time consuming, and the initial expense excessive.

The present invention makes use of rubber mountings in certain preferred forms which will be set forth hereafter. The arrangements shown provide a compact, light, and convenient individual suspension for each wheel unit. The problem of lubrication is eliminated, maintenance is reduced to a minimum, and the entire suspension unit may be quickly replaced when desired.

In my embodiments, as set forth below, the unsprung weight is greatly reduced, which is of acknowledged advantage in reducing wear and tear on the highways, while the truck operator benefits by considerable savings in the first cost as well as in upkeep.

These and other advantages will appear to those skilled in the art from the following description, and from the drawings, in which I have illustrated the preferred embodiment of my invention.

In the drawings:

Figure 3 is a side view, partially in section, of the embodiment of Figure 1;

Figure 4 is a sectional view, taken as indicated by arrows 4—4 of Figure 3, showing in detail the structure of one of my resilient suspension units;

Figure 5 is a top sectional view of the suspension unit of Figure 4, taken as indicated by line 5—5 of that figure;

Figure 6 is an end sectional view of the suspension unit of Figure 4, taken as indicated by line 6—6 of that figure;

Figure 7 is a sectional view corresponding to that of Figure 6, but with the suspension unit illustrated in a flexed position corresponding to that assumed when the wheels occupy the dotted-line positions illustrated in Figure 3;

Figure 8 is a view, partially in section, taken in the direction indicated by arrows 8—8 of Figure 1, showing the connection between the walking beam and each wheel pair;

Figure 9 is a plan view of a modified form of suspension unit and casing construction;

Figure 10 is a side view thereof;

Figure 11 is a vertical transverse sectional view on line 11—11 of Figure 10; and Figure 12 is a similar view showing the cushion elements under stress.

Figure 1:
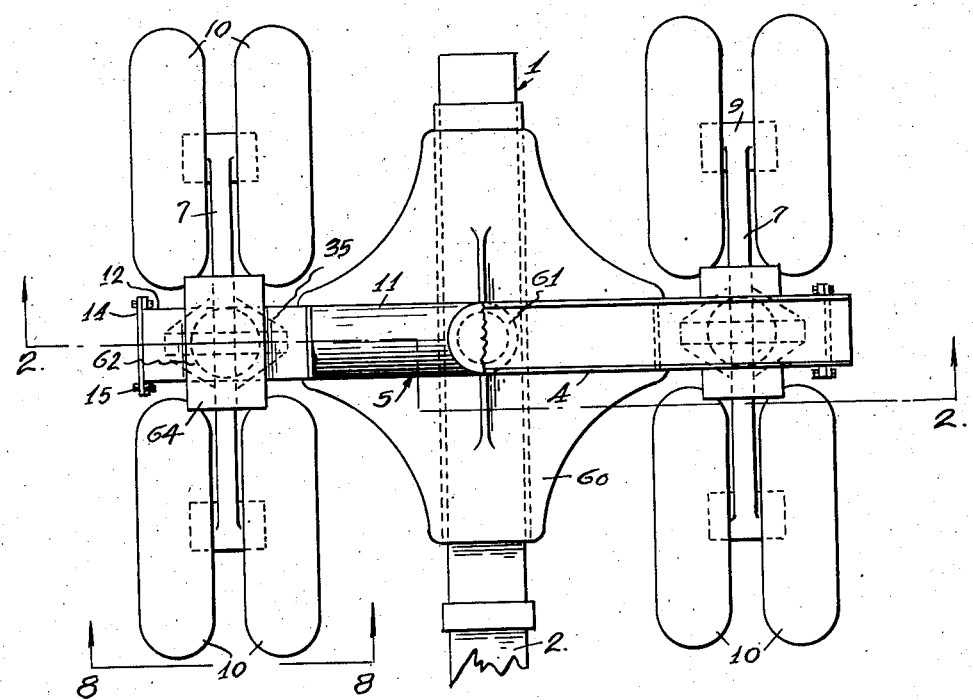
Figure 1 is a top view of an eight-wheel supporting unit embodying a preferred form of my invention, taken in the plane of line 1—1 in Figure 2.
Figure 2:
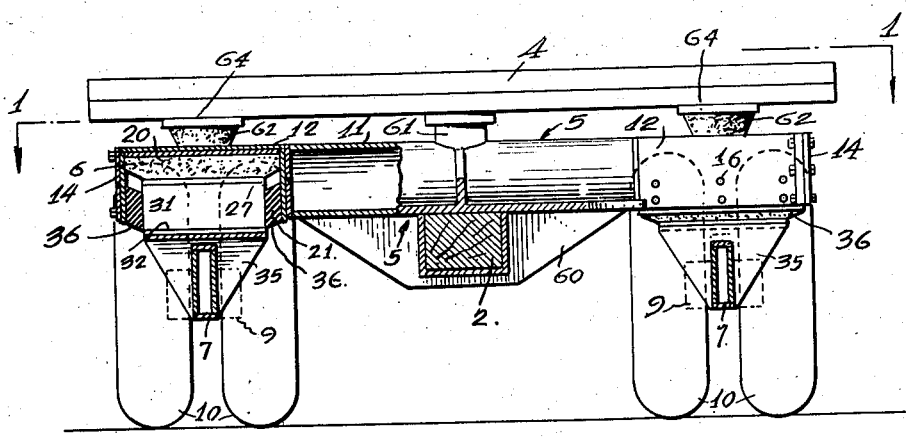
Figure 2 is an end view of the embodiment shown in Figure 1, taken as indicated by the section line 2—2 of that figure, and partially in section.

Directing attention now to Figures 1 and 2 of the drawings, I have shown an eight-wheel trailer unit, generally denominated as 1, which is joined to a suitable motor-driven unit, not shown, by a connecting member 2. The load is carried directly on a bunk 4 supported on a bolster 5. Bolster 5 extends transversely from the connecting member 2, and has at each end thereof resilient mounting units 6 to which are attached equalizer or walking beams 7 extending parallel to the connecting member 2. At each end of each walking beam 7 is formed a hub 9 to which a pair of wheels 10 is connected. The detail of the mounting in hub 9 is shown in Figure 8, and will be described hereafter.

The bolster 5 may conveniently be formed with a tubular central section 11, to either end of which is secured a rectangular socket 12 in which the resilient mounting unit 6, hereinafter called simply the cushion 6, is held. Socket 12 is open on the bottom, and at the outer end is closed by a removable end plate 14 held in position by suitable means such as bolts 15. The cushion unit 6 is secured in socket 12 by a plurality of bolts 16 threadably inserted through side walls 17 of the socket 12 and into steel casing 19 of the cushion 6.

The details of the cushion unit 6 and the manner in which it rockably attaches the walking beam 7 to the bolster 11 will next be considered. This rockable connection permits the front and rear pairs of wheels 10 to accommodate themselves in turn to inequalities in the road surface, producing a vertical displacement of the bolster 5 which is only half that which would be experienced if a single set of wheels were used on each side or if beam 7 were not permitted to rock.

Each of the cushion units 6 comprises an oblong rectangular steel casing 19 open at the bottom, and of proper size to fit snugly within socket 12. Within the casing 19, and bonded thereto by means well known in the art, is a compression block 20 of rubber, which carries the vertical load, and a centrally slotted torsion block 21, likewise of rubber, which carries the horizontal stresses and provides for rocking of beam 7.

A comparison of Figures 6 and 7 will indicate the manner in which the torsion block 21 deforms from the normal when stress is applied to tilt the pairs of wheels attached to walking beam 7 out of alignment parallel to the line of travel of the trailer unit 1, as for example when the wheels are rocked into one of the dotted line wheel positions 22 or 24 (Figure 3) by inequalities in the road surface.

The compression block 20 is substantially rectangular in outline, and is pierced vertically by a plurality of apertures 25 aligned in a single row centrally of the block. The purpose of these apertures 25 is dual; to provide space for the deformation of the rubber under load and to permit the insertion of a plurality of bolts 26 through a rectangular steel load plate 27 bonded to the underside of the block 20. The load plate 27 extends across the full width of the block, but is shorter than the casing 19, so that end portions 27' overhang the plate 27. The under surface 29 of end portions 27' may be sloped upwardly from the plate 27 to the end walls 30 of casing 19 to reduce the amount of rubber required.

Bolts 26 are used to secure load plate 27 to a flat rectangular column 31 which is bonded to, and extends centrally through, the slot in torsion block 21. A lower load plate 32 is bonded to the under surface of torsion block 21, and is apertured to permit insertion of a row of bolts 34 for connection to column 31 of a webbed bracket 35 extending upwardly from the walking beam 7 and engaging plate 32. The under surface 36 of that portion of torsion block 21 overhanging the lower load plate 32 inclines upwardly toward the casing 19. In assembling the cushion unit in this fashion, it will be apparent that the weight of the load will be transmitted to the walking beam 7, and thence to wheels 10, from the rectangular column 31, while column 31 receives its stress through the rectangular cushioning compression block 20. As the wheels encounter obstructions in the road, the equalizer or walking beam 7 rocks about an axis 37 approximately coinciding with the center line of the upper load plate 27, while torsion block 21 deforms to cushion the movement. The action during deformation, shown in Figure 7, is such that a portion of block 21 acts in tension, while the remainder is under compression. The direction of the rocking movement is immaterial, and the effect is one of rapidly damping the movement about axis 37.

Lateral thrusts are absorbed by the end portions 36 of the torsion block 21.

The walking beam 7 may be of hollow rectangular section, with the webbed bracket 35 formed centrally thereof and the hubs 9 formed at each end. The hub 9 is a cylindrical member mounted transversely of the beam 7, and may be conveniently formed integrally therewith by welding. An axle 40 is mounted rotatably within hub 9 by means of thrust bearings 41 disposed at either end thereof and held in position by suitable thrust washers 42 and lock nuts 44 threaded onto axle 40 at 45. Conventional lubricant-retaining seals 46 are inserted in the ends of hubs 9. Wheel hubs 47 are fixed on axle 40, with brake drums 49 extending inwardly therefrom, by means of locked nuts 48. Conventional disc wheels 50 carrying tires 51 are removably secured to hubs 47 by the usual means, such as bolts 52.

Within brake drums 49 is secured brake lining 53, which is engaged to produce braking action by brake shoes mounted on brake hub 54. The brake shoes and actuating mechanism therefor have been schematically illustrated at 55 attached to the brake hub 54, which is in turn secured to hub 9. The braking mechanism is protected from dirt by a flanged closure plate 56, also secured to hub 9. The details of the braking mechanism form no part of the present invention, since many satisfactory forms are known in the art.

Returning now to Figures 1 to 3 of the drawings, a webbed casting 60 is shown securing the connecting member 2 to the bolster 5 and maintaining the alignment of the latter rigidly normal to the former, and in addition providing vertical reinforcing for the bolster.

In the logging industry, for which the illustrated trailer embodiment is designed, as in any trailer service where very long loads are carried, provision must be made for curves in the roads, and the load must be allowed some freedom to turn in a horizontal plane relative to the trailer unit. Hence, the bunk 4, on which the load is carried, is joined to bolster 5 centrally by a pivotal coupling 61. A resilient block 62 is mounted in bolster 5 over each cushion unit 6, and has secured to the upper side thereof a smooth rounded end engaging plate 64 which extends parallel to walking beam 7. The bunk 4 rests on plates 64, so that the load is evenly distributed over the bolster. The sliding contact between plates 64 and bunk 4 allows the bunk to turn on pivotal coupling 61 and still be supported by each end of the bolster as well as by the central coupling.

From the above description it will be obvious to those skilled in the art that my invention is a compact, light suspension unit which requires very little attention, but which can be removed with a minimum of time and expense. The design permits the tandem mounted paired wheels on each side of the trailer to accommodate to road inequalities without reference to those on the opposite side. Further, the front and rear wheel pairs of each wheel unit encounter each particular obstacle separately, and the vertical load displacement resulting is halved by the walking beam mounting. Lateral thrusts, as well as those parallel to the direction of motion, are absorbed by my suspension unit, and the rubber cushions provide a smoother haul with rapid damping effects.

The modified embodiment illustrated in Figures 9 to 12 is one preferred for heavy duty and involves structure for transmitting the operating stresses to the lateral cushions as both compression and shearing forces. In this construction each cushion unit comprises an oblong, generally rectangular casting 65, having a central rectangular space or opening, and being formed with a circumferential flange 66 at its upper edge and a similar, but wider flange 67 at its lower edge. The central portions of flange 67 may be gradually flared or widened towards its central longitudinal portions for greater stability, as seen in Figure 9, and spaced webs 68 connecting the flanges and vertical walls of the casting contribute additional rigidity. The top of casting 65 receives a box-like cap housing 69 formed with a circumferential flange 70 which fits on and is bolted to flange 66 of the casting as shown. Casting 65 and housing 69 together form the casing for reception of the resilient mounting elements. An important feature of this casing structure is that the vertical walls 71 of the casting 65 are inclined on upwardly converging planes, as best seen in Figure 11, giving this portion of the housing the form of a rectangular truncated pyramid. A compression block 72, of rubber, corresponding to block 20 of the first described embodiment of my invention, but conforming in shape to that of the casting, is contained within the housing 69, and is bonded to the upper flanges of the oblong rectangular load column 73 positioned within the casting portion 65 of the casing. In this instance the load column and flanges acting as load plates are preferably of I-beam form with the upper lateral flanges bolted to the column as at 74 to facilitate assembly. The lower flanges of column 73 are bolted to a bracket 75 corresponding to the same bracket 35 of the first described embodiment.

As in the first described embodiment of my invention, the load column 73 is surrounded by and bonded to a torsion and compression rubber block 76, the peripheral walls of which are bonded to the inclined inner walls 71 of the casting 65. As will be readily understood, the inclination of the casing walls in this construction will result in introducing the feature of compression when the rubber block 76 is subjected to a load and/or is distorted by movement of the walking beam and correspondingly reducing the shearing stress, as most desirable under heavy loads.

Rubber block 76 may be initially made in a truncated pyramidal form to conform to the inner walls of the portion 65 of the casing so that it will be substantially relieved of compression except under load, or it may be initially made either with vertical outer faces or outer faces more nearly vertical than the inner faces of the portion 65 of the casing, so that it will be under more or less compression even when substantially relieved of load. The particular arrangement to be preferred will depend upon the maximum loads which the vehicle is designed to carry, a higher initial compression of the rubber being desirable where heavier maximum loads are to be transported.

It will be obvious that further modifications of my invention may be possible without departure from the scope thereof as defined by the following claims.

I claim:

1. In a vehicle having wheels and a frame, means for resiliently connecting said wheels to said frame, comprising a bolster fixed transversely to said frame, equalizer beams disposed normal to said bolster, wheel pairs rotatably mounted in tandem on said beams, and cushioning units joining each of said equalizer beams to said bolster, comprising an oblong rectangular housing fixed to said bolster, a load-supporting cushion fixed to said beam and contained within said housing, and a thrust and torsion absorbing cushion also contained within said housing, said cushions extending throughout the length of the housing.

2. In a vehicle having a plurality of wheels, a frame, and equalizer beams joining said wheels in tandem on both sides of said frame, means for connecting said beams rockably to said frame, each of said means comprising a load plate fixed to said beam, an oblong rectangular load column secured to said plate, an upper load plate fixed on said column, a rubber block surrounding said column and arranged to cushion horizontal thrust and torsion stresses between said beam and said frame, a rubber block bonded over said upper load plate and arranged to cushion vertical load stresses between said beam and said frame, and a housing surrounding said blocks and secured to said frame.

3. In a vehicle having a frame and a plurality of wheels, means for mounting said frame resiliently on said wheels, comprising a bolster fixed transversely to said frame, a seat formed at each end of said bolster, a cushioning unit removably fixed in each of said seats, and an equalizer beam fixed to each of said units and having pairs of said wheels mounted thereon in tandem; each of said cushioning units including a casing arranged to fit snugly within said seat, means for removably securing said casing in said seat, a vertically perforated rubber load block bonded within said casing, a load plate bonded beneath said block, a load column secured to said plate, a rubber thrust and torsion block bonded about said column and within said casing, a lower load plate secured to said column and bonded to said thrust and torsion block, and an equalizer beam secured to each of said lower load plates.

4. The combination with a vehicle having a frame and a plurality of wheels tandem-mounted on equalizer beams, means for joining said vehicle frame resiliently to said equalizer beams, comprising a bolster fixed transversely of said frame, a seat formed in each end of said bolster, a resilient supporting unit fitting snugly within each of said seats, means for removably securing said units in position in said seats, and means for securing each of said units to one of said equalizer beams, said units including each a casing, a rubber load-supporting block bonded into the upper portion of said casing, a plurality of vertical bores cut through said block, an upper load-carrying plate bonded underneath said block, a load-carrying column removably fixed to said plate, a thrust and torsion rubber block bonded within said casing and about said column, a lower load-carrying plate bonded underneath said thrust and torsion block and removably fixed to said column, and means for removably attaching each of said lower load-carrying plates to one of said equalizer beams.

5. In a vehicle having a plurality of wheels, a frame, and equalizer beams joining said wheels in tandem on both sides of said frame, means for connecting said beams rockably to said frame, comprising a bolster extending transversely to said frame, oblong cushion-receiving casings disposed terminally of said arms parallel thereto, centrally slotted oblong rubber cushions flat supporting columns projecting from said equalizer beams parallel to said bolster and into said slotted cushions.

6. In a vehicle having a frame, a plurality of wheels, and walking beams arranged to mount said wheels in tandem, means for joining said beams to said frame, comprising a bolster extending transversely of said frame, oblong rectangular cushion-receiving casings formed terminally of said arms, oblong rubber cushions housed in said casings, and flat supporting columns fixed centrally of said beams and centrally extended through said rubber cushions.

7. In a vehicle having a frame, equalizer beams, and a plurality of wheels tandem-mounted on said beams, means for joining said beams resiliently to said frame, comprising a bolster extending transversely to said frame, opposed cushion-receiving casings formed with upwardly converging walls and fixed terminally on said bolster, centrally slotted rubber cushions disposed in said receiving casings, and load columns projecting centrally from said walking beams through the slot in said cushions.

8. In a vehicle, a frame, a plurality of wheels, walking beams mounting said wheels in tandem, and means for supporting said frame resiliently on said beams, comprising a bolster extending transversely of said frame, oblong rectangular cushion-receiving casings downwardly opened at each end of said bolster and having a seat in each formed with upwardly converging walls, a centrally slotted rubber member disposed in each of said seats, and a load column comprising an elongated member disposed in the slot axially of said rubber members and extending centrally therethrough.

9. In a vehicle, a frame, a plurality of wheels, walking beams mounting said wheels in tandem, and means for supporting said frame resiliently on said beams, comprising a bolster extending transversely of said frame, an oblong rectangular cushion receiving casing disposed parallel to said bolster at each end thereof and opened downwardly, each casing comprising a lower seat portion and an upper cap portion, a centrally slotted elongated rubber cushion member secured in each of said seats, a load column comprising an elongated vertical plate disposed centrally in the slot of each rubber member and bonded thereto, a horizontal load surface formed on the upper end of each column, and a resilient member interposed between each of said load surfaces and the cap portions of said casings.

10. In a vehicle, a frame, a plurality of wheels, walking beams mounting said wheels in tandem, and means for supporting said frame resiliently on said beams, comprising a bolster extending transversely of said frame, an oblong rectangular cushion receiving casing disposed parallel to said bolster at each end thereof and opened downwardly, each casing comprising a lower seat portion formed with upwardly converging inner walls and an upper cap portion, a centrally slotted elongated rubber cushion member, compressed to a form fitting within said seat portion, secured in each of said seats, a load column comprising an elongated vertical plate disposed centrally in the slot of each rubber member and bonded thereto, a horizontal load surface formed on the upper end of each column, and a resilient member interposed between each of said load surfaces and the cap portions of said casings.

THEODORE A. PETERMAN.